United States Patent
Ahrens et al.

(10) Patent No.: US 8,392,980 B1
(45) Date of Patent: Mar. 5, 2013

(54) TRUSTED HOST LIST FOR TLS SESSIONS

(75) Inventors: David Ahrens, San Jose, CA (US); Amit Agarwal, Milpitas, CA (US); Manish Gaur, Pleasanton, CA (US); Robert Serkowski, Broomfield, CO (US); Frank J. Boyle, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 496 days.

(21) Appl. No.: 12/196,584

(22) Filed: Aug. 22, 2008

(51) Int. Cl.
*H04L 29/00* (2006.01)

(52) U.S. Cl. ............ 726/10; 726/27; 380/247; 380/248; 380/249; 380/250

(58) Field of Classification Search .................. None
See application file for complete search history.

(56) References Cited

U.S. PATENT DOCUMENTS

| | | | |
|---|---|---|---|
| 6,971,017 B2 * | 11/2005 | Stringer et al. ............... 713/182 |
| 2003/0196087 A1 * | 10/2003 | Stringer et al. ............... 713/171 |
| 2004/0030887 A1 * | 2/2004 | Harrisville-Wolff et al. . 713/155 |
| 2004/0111375 A1 * | 6/2004 | Johnson ........................... 705/64 |
| 2005/0010801 A1 * | 1/2005 | Spies et al. ..................... 713/200 |

OTHER PUBLICATIONS

Housley et al., "Internet X.509 Public Key Infrastructure Certificate and Certificate Revocation List (CRL) Profile", available at http://www.ietf.org/rfc/rfc3280.txt, Network Working Group, Apr. 2002, 121 pages.

* cited by examiner

*Primary Examiner* — David García Cervetti
*Assistant Examiner* — Ghazal Shehni
(74) *Attorney, Agent, or Firm* — Sheridan Ross P.C.

(57) ABSTRACT

Methods, devices, and systems for creating and using a trusted host list for Transport Layer Security (TLS) sessions are provided. The proposed solutions described herein provide a mechanism of specifying authorization policy for TLS sessions where such authorization was traditionally implied by the possession of a certificate issued by a mutually trusted third party. The proposed solutions also provide for wildcard use and regular expression matching to simplify administration of the trusted host list.

22 Claims, 5 Drawing Sheets

| | CA Certificate | Matching Target | Matching Value | Description |
|---|---|---|---|---|
| 1 | Avaya CA | SubjectAltName-DNSName | *.finance.avaya.com | If the far end identity certificate is successfully verified by Avaya CA and it contains finance.avaya.com in the SubjectAltName, the far end will be considered a trusted host |
| 2 | Avaya CA | SubjectAltName-DNSName | user.avaya.com | If the far end identity certificate is successfully verified by Avaya CA and it has user.avaya.com in the SubjectAltName, the far end will be considered trusted host |
| 3 | Verisign CA | CN | 28.55.124.233 | If the far end identity certificate is successfully verified by Verisign CA and it has 28.55.124.233 in the CN, the far end will be considered trusted host |
| 4 | Verisign CA | DN | CN=trusteduser,o=avaya,c=us | If the far end identity certificate is successfully verified by Verisign CA and it has CN=trusteduser,o=avaya,c=us in the DN, the far end will be considered trusted host |
| 5 | Entrust CA | CN | * | If the far end identity certificate is successfully verified by Entrust CA, the far end will be considered trusted host |
| 6 | Any | SubjectAltName-IPAddress | 20.33.454.23 | If the far end identity certificate is successfully verified by any CA and it has 20.33.454.23 in the SubjectAltName, the far end will be considered trusted host |
| 7 | VeriSign CA | CN | !server1.engg.att.com | "server1.engg.att.com" is NOT a Trusted Host. |

|   | CA Certificate | Matching Target | Matching Value | Description |
|---|---|---|---|---|
| 1 | Avaya CA | SubjectAltName-DNSName | *.finance.avaya.com | If the far end identity certificate is successfully verified by Avaya CA and it contains finance.avaya.com in the SubjectAltName, the far end will be considered a trusted host |
| 2 | Avaya CA | SubjectAltName-DNSName | user.avaya.com | If the far end identity certificate is successfully verified by Avaya CA and it has user.avaya.com in the SubjectAltName, the far end will be considered trusted host |
| 3 | Verisign CA | CN | 28.55.124.233 | If the far end identity certificate is successfully verified by Verisign CA and it has 28.55.124.233 in the CN, the far end will be considered trusted host |
| 4 | Verisign CA | DN | CN=trusteduser,o=avaya,c=us | If the far end identity certificate is successfully verified by Verisign CA and it has CN=trusteduser,o=avaya,c=us in the DN, the far end will be considered trusted host |
| 5 | Entrust CA | CN | * | If the far end identity certificate is successfully verified by Entrust CA, the far end will be considered trusted host |
| 6 | Any | SubjectAltName-IPAddress | 20.33.454.23 | If the far end identity certificate is successfully verified by any CA and it has 20.33.454.23 in the SubjectAltName, the far end will be considered trusted host |
| 7 | VeriSign CA | CN | !server1.engg.att.com | "server1.engg.att.com" is NOT a Trusted Host. |

*Fig. 3*

TRUSTED HOST LIST FOR TLS SESSIONS

FIELD OF THE INVENTION

The invention relates generally to the use of digital certificates to establish membership in trusted networks.

BACKGROUND

A Transport Layer Security (TLS) session as well as its predecessor, the Secure Sockets Layer (SSL), are cryptographic protocols that provide secure communications on the Internet or other networks for such things as web browsing, e-mail, Internet faxing, instant messaging and other data transfers. There are slight differences between SSL and TLS, but they are essentially the same.

TLS provides endpoint authentication and communications privacy over untrusted networks using cryptography. Typically, only the server is authenticated (i.e., its identity is ensured) while the client remains unauthenticated; this means that the end user (whether an individual or an application, such as a Web browser) can be sure with whom it is communicating. The next level of security in which both ends of the "conversation" are sure with whom they are communicating is known as mutual authentication. Mutual authentication requires public key infrastructure (PKI) deployment to clients unless TLS-PSK or the Secure Remote Password (SRP) protocols are used, which provide strong mutual authentication without needing to deploy a PKI.

TLS involves three basic phases: (1) Peer negotiation for algorithm support; (2) Key exchange and authentication; and (3) Symmetric cipher encryption and message authentication.

During the first phase, the client and server negotiate cipher suites, which determine the ciphers to be used, the key exchange and authentication algorithms, as well as the message authentication codes (MACS). The key exchange and authentication algorithms are typically public key algorithms, or as in TLS-PSK pre-shared keys could be used. The message authentication codes are made up from cryptographic hash functions using the HMAC construction for TLS, and a non-standard pseudorandom function for SSL.

SSL is a handshake with two-way authentication that utilizes digital certificates. A TLS client and server negotiate a stateful connection by using a handshaking procedure. During this handshake, the client and server agree on various parameters used to establish the connection's security.

The handshake begins when a client connects to a TLS-enabled server requesting a secure connection, and presents a list of supported ciphers and hash functions. From this list, the server picks the strongest cipher and hash function that it also supports and notifies the client of the decision. The server sends back its identification in the form of a digital certificate. The certificate usually contains the server name, the trusted certificate authority (CA), and the server's public encryption key, normally included in the server's digital certificate. The client may contact the server that issued the certificate (the trusted CA as above) and confirm that the certificate is authentic (not revoked) before proceeding. When generating the session keys used for the secure connection, the client encrypts a random number with the server's public key, and sends the result to the server. Only the server can decrypt it (with its private key): this is the one fact that makes the keys hidden from third parties, since only the server and the client have access to this data.

From the random number, both parties generate key material for encryption and decryption. This concludes the handshake and begins the secured connection, which is encrypted and decrypted with the key material until the connection closes. If any one of the above steps fails, the TLS handshake fails, and the connection is not created.

Digital certificates are commonly used in cases where browsers are involved in TLS connections. There are also cases where TLS connections do not involve using browsers. Browsers are typically used when a user wants to buy something from a website (e.g., Amazon.com). When the user reaches the check-out page on the amazon.com web site, a secure connection is established. (The "lock" is displayed in the browser.) This secure connection uses the TLS protocol, which requires the use of small files called digital certificates that are exchanged during TLS establishment. The website (Amazon.com in this example) sends its certificate to the user's browser and the browser validates the certificate. Validation of the certificate is typically accomplished by checking two things: (1) that the certificate was issued to a web site whose address appears in the browser's address bar and (2) that the signature of the certificate is valid.

A CA issues the digital certificate for a web site. When the CA issues a certificate for a web site, the CA computes a digital signature for the certificate and stores the result in the certificate being issued. This process involves using encryption technology and employs an encryption key.

When the browser receives the digital certificate from amazon.com, the browser must be able to validate its signature. To do this, the browser needs an encryption key related in a special way to the one used by the CA to create the signature in the first place. This encryption key is provided in another certificate issued by the certificate authority; this certificate is a special certificate, called a root certificate. The browser generally comes pre-loaded from the software provider (e.g., Microsoft® if Internet Explorer® is used as the browser) with a number of such certificates. These certificates are called trusted certificates.

Once the browser has access to the certificate from the CA used to sign the amazon.com certificate it can use that trusted certificate to obtain the encryption key needed to verify the signature on certificates received from amazon.com, for example.

The browser finds the signature is valid if it computes the same hash value that is stored in the certificate, determines that the ISSUED TO field in the certificate has the same value as the web site in the browser's address bar (i.e., www.amazon.com) and further identifies that the certificate was issued by the trusted CA. After making these determinations, the browser will allow the user to continue with checkout.

Many TLS connections, on the other hand, are server to server and do not involve a human user at a browser. In such a case where a browser is not involved, a customer network may include many servers interconnected with one another. Typical customer networks may include up to hundreds of servers connected to one another in various configurations and via various protocols.

SUMMARY

With reference to FIG. 1, assume that server 104 is amazon.com. Then server 104 has a certificate issued by some CA, like Verisign. Each server 108 has a copy of the root certificate for the trusted CA, like Verisign. Now, each server 108 will allow a connection to server 104 because the certificate received during TLS setup from server 104 can be validated by each server 108. Server 104 is happy to accept any connection from any server 108 regardless of whether they actually validate server 104's certificate or not. It is server 108 that does the permitting or denying of the TLS connection.

Amazon.com doesn't care who the connecting user is as long as the user's credit card is valid.

Server 104 has an individual certificate issued by a CA. Servers 108 have the root certificate for this CA in their trusted store. This is generally referred to as a one-way authentication with the client limiting who can connect. An option is also provided for 2-way authentication wherein both ends have certificates.

A problem in existing systems that utilize a digital certificate is that any time a server is moved to a different subnet, for example, it must be issued a new certificate corresponding to its new address or the counterpart server won't accept connections from it. This is getting painful, especially in large networks with hundreds of servers.

The present invention is directed generally to the use of a trusted host list in connection with a TLS session or similar type of secure communication session (e.g., an SSL session or the like), the method generally comprising:

receiving a digital certificate from a far end device;

determining that a Certificate Authority (CA) which issued the digital certificate to the far end device is an authorized CA;

establishing a secure communication session with the far end device;

comparing a one or more field values of the digital certificate against at least one trusted host rule set in a trusted host list; and making a decision related to establishing and maintaining the secure communication session based on the comparing step.

One aspect of the present invention is to enhance the manner in which TLS connections are authorized and also to simplify certificate management in large networks. In accordance with at least some embodiments of the present invention, once a mutually authenticated TLS session has been negotiated (e.g., via analysis of the CA of the digital certificate and confirmation of the URL), the following changes are proposed to add authorization checks to the TLS session. One proposed change is to add the concept of a trusted host list to the authorization process. In the prior art, a browser or primary server accepted an incoming certificate based on the certificate being valid and the ISSUED TO field containing the FQDN of the server that sent the certificate. The use of a trusted host list allows this requirement to be generalized by saying that the certificate must have "content" that matches a pre-administered list.

Another proposed change is to add flexibility to which field is checked in the incoming certificate. The ISSUED TO field typically corresponds to the Common Name (CN) field in a digital certificate. But, most digital certificates have a number of fields that can be checked. One such field is the "subject alternate name" field. The advantage of expanding the fields that can be analyzed in the digital certificate will be explained shortly.

Yet another proposed change is to incorporate the ability to establish matching criteria using "wild cards." For example, "server*.mycompany.com" would match server1.mycompany.com or server2.mycompany.com in the certificate CN field. Similarly, "voip*.mycompany.com" would match voip-denver.mycompany.com and voip-lincroft.mycompany.com. The required matching value "voip*" could be allowed to match any string beginning with the letters v-o-i-p in the subject alternate name field, for example.

The advantages associated with instituting the use of a trusted host list, increasing the flexibility to which field is checked in a certificate, and incorporating the use of wild cards are described in the following example. Suppose that a customer has many servers in their network and only a subset of these servers should be allowed to connect to a primary server (e.g., an Avaya server). If the customer issues certificates with a "subject alternate name" containing the string "voip" at the beginning of the string, (e.g., voipDenver, voipLincroft, voipMilpitas, etc.) and the matching criteria is "voip*", then the ISSUED TO field in the certificate may not matter for the establishment and maintenance of a TLS session. Further, the subject alternate name field (in this example) does not have to be common among servers, but can also be used for additional information (e.g. location, in this example). If the ISSUED TO field of the certificate contains the FQDN and the customer's server is moved to different subnets from time to time, it will not matter. The primary server will continue to accept the certificates issued by that customer server based on the value in the "subject alternate name" field. Thus, the customer is given greater flexibility to move its servers from subnet to subnet without requiring any further certificate management. It should be noted, however, that in this example servers that do not have a certificate with a subject alternate name containing the "voip" string are not accepted by the primary server. Additionally, server certificates may be signed by any CA the customer chooses and the customer does not need to have a special CA just for the company owning the primary server (e.g., Avaya).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions or data to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 3 is a diagram depicting an exemplary trusted host list utilized in accordance with at least some embodiments of the present invention.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to provide digital certification.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
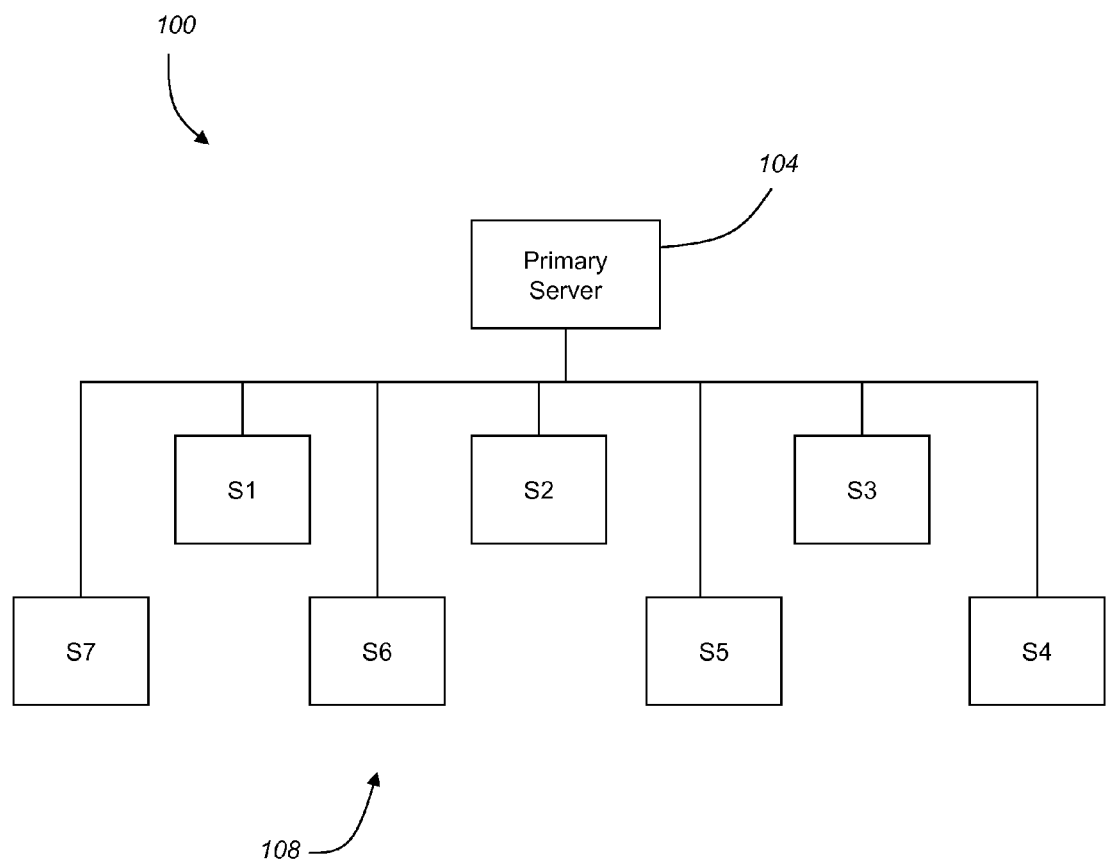
FIG. 1 is a block diagram depicting a communication system.
Figure 2A:
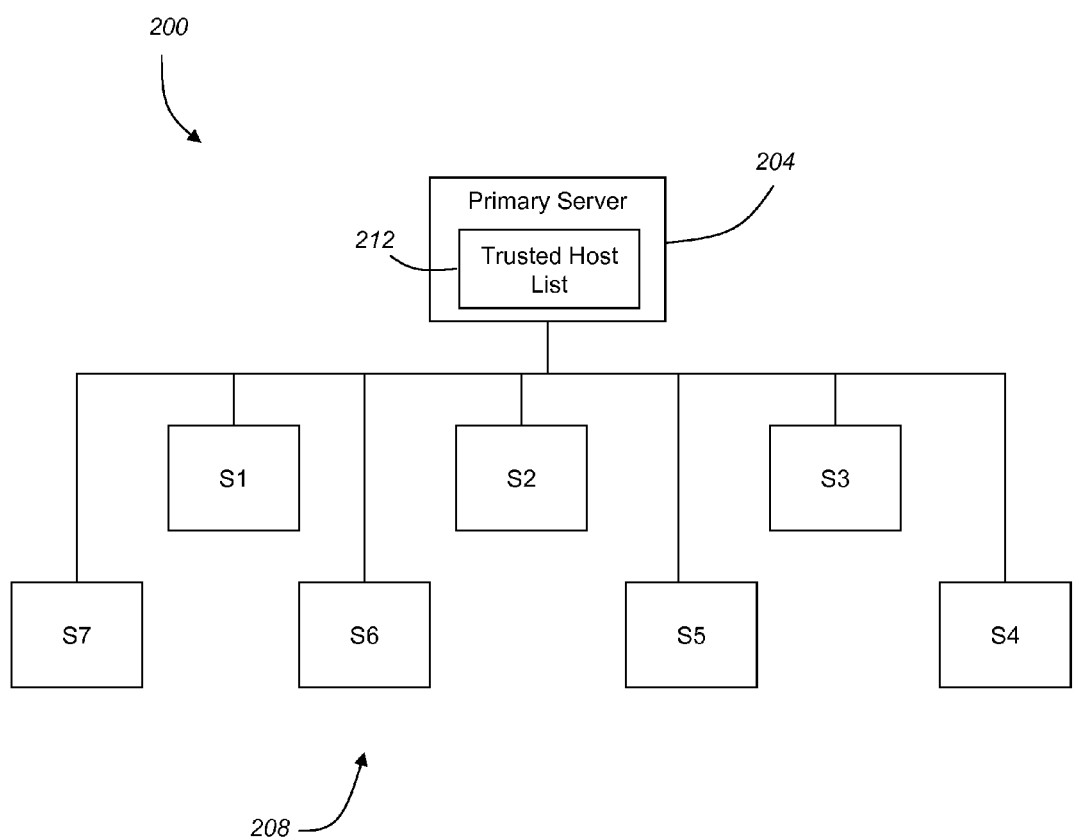
FIG. 2A is block diagram depicting a first communication system configuration in accordance with at least some embodiments of the present invention.
Figure 2B:
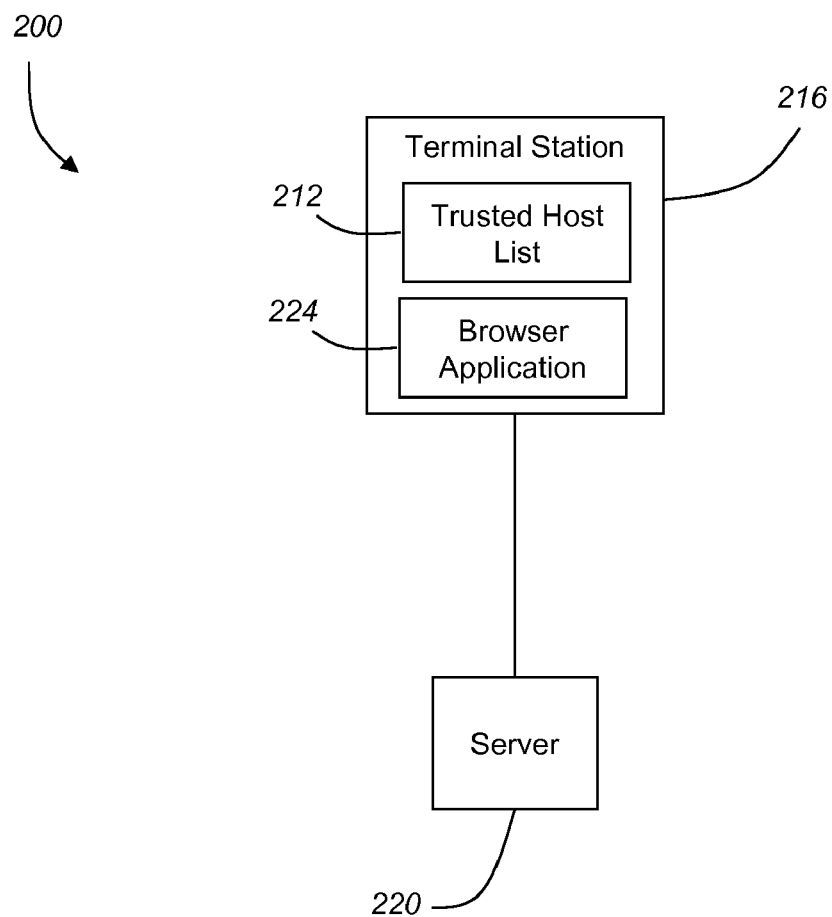
FIG. 2B is a block diagram depicting a second communication system configuration in accordance with at least some embodiments of the present invention.

Referring to FIGS. 2A and 2B, an exemplary communication system 200 will be described in accordance with at least some embodiments of the present invention. A first configuration of the communication system 200 is depicted in FIG. 2A and may include a primary server 204 in communication with one or more other servers or devices e.g. telephones 208. The primary server 204 may provide specified services and/or functions for the other servers 208. As an example, the primary server 204 may provide Voice over IP (VoIP) functionality to the other servers 208. The other servers 208 may request a secure connection (e.g., a TLS connection) with the primary server 204 by transmitting a digital certificate to the primary server 204. If the primary server 204 decides to allow the secure connection based on its analysis of the digital certificate provided by the other server 208, then the services of the primary server 204 may be provided to the other server 208. During its analysis of the digital certificate, the primary server 204 may refer to a trusted host list 212 stored thereon. Even after a secure connection has been established between servers 204, 208, the primary server 204 may further analyze the digital certificate to determine if the secure connection is to be maintained. During its analysis of the digital certificate, the primary server 204 may refer to a trusted host list 212 stored thereon. The trusted host list 212 may comprise a listing of fields and required values for such fields that are checked in the digital certificate received from the other server 208.

A second configuration of the communication system 200 is depicted in FIG. 2B and may include a terminal station 216 in communication with a server 220. The server 220 may correspond to a web server, Session Initiation Protocol (SIP) server, VoIP server, media server, or the like and the terminal station 216 may include a personal computer, laptop, Personal Digital Assistant (PDA), portable email retrieval device, cellular phone, SIP User Agent, or any other type of end device. In accordance with at least one embodiment of the present invention, the terminal station 216 may include a browser 224 that is operable to retrieve files and other content from the server 220 as well as utilize applications provided on the server 220. The terminal station 216 may also include a trusted host list 212 that can be referenced when the terminal station 216 attempts to establish a secure connection (e.g., a TLS connection) with the server 220.

Each of the communication devices 204, 216 may include a processor that executes instructions stored on a computer readable medium (e.g., an application stored in memory). An example of one such application that is executed by the processor is the browser 224. Other examples may include VoIP applications, SIP applications, and other applications known and yet to be developed. During execution of these instructions, and during the course of its operation, the communication devices 204, 216 may attempt to establish a secured connection with another (far end) network device at which point the processor may analyze contents of a received digital certificate and compare its contents to content requirements defined in the trusted host list 212. Based on this analysis and comparison, the processor may make a determination as to whether a secure connection will be established at the transport layer with the far end network device such that the application (e.g., the browser 224) can continue retrieving data from the far end network device in a secured fashion.

Referring now to FIG. 3, an exemplary trusted host list 212 will be described in accordance with at least some embodiments of the present invention. The trusted host list 212 may include a number of different fields that can be used to determine whether a TLS session can be established with a far end network device (e.g., a CA Certificate field 304) as well as fields that can be used to determine whether an existing TLS session should be torn-down or otherwise discontinued (e.g., a matching target field 308, matching value field 312, and/or description field 316). Although only one matching target field 308 is depicted in the trusted host list 212, one skilled in the art will appreciate that multiple matching target fields 308 may be provided in a single trusted host rule set. Thus, a particular trusted host rule set may require the analysis of multiple fields of a digital certificate prior to establishing or maintaining a TLS session.

The trusted host list 212 may contain a number of different trusted host rules (organized as the rows of the depicted trusted host list 212), each with a particular CA requirement and other field requirements. In most instances, if a digital certificate provided by a potential host server meets the requirements of one trusted host rule set, then a TLS session may be established and maintained with that host server. There are exceptions, however, to this general rule. For instance, if a trusted host rule set defines a NOT rule, then a digital certificate provided by a potential host must not violate the trusted host NOT rule set while also satisfying at least one other trusted host rule set provided in the trusted host list 212 (assuming the trusted host list 212 contains another trusted host rule set, otherwise a potential host will be considered trusted as long as it does not violate the trusted host NOT rule set). With reference to the depicted trusted host list 212, for example, a digital certificate would have to meet at least one of trusted host rule sets 1-6 in addition to not violating the trusted host NOT rule set 7 to allow a TLS session to be established with a potential host. As can be appreciated, multiple trusted host NOT rule sets may be provided in a single trusted host list 212, thereby increasing the number of rule sets that are analyzed by the communication device 204, 216.

The CA Certificate field 304 in the trusted host lists 212 provides an indicator of an allowable CA or issuer of a digital certificate for a particular trusted host rule set. An actual CA may be identified in the CA Certificate field 304. Alternatively, if a particular trusted host rule set does not discriminate based on the CA that issued the digital certificate, then the value in the CA Certificate field 304 may be set to ANY or a similar wildcard value. A value of ANY in the CA Certificate field 304 will match the trusted host entry irrespective of which CA certificate was used for identity certificate verification.

The Matching Target field 308 may define the field of the digital certificate that will be analyzed to determine whether a TLS session is allowed with a potential host. The following are example matching targets that may be allowed in the Matching Target field 308, with potential value types identified in parenthesis:

SubjectAltName-DNSName: (string, wildcard supported)
SubjectAltName-IPAddress: (string)
Common Name (CN): (string, wildcard supported for DNS names)—Most Specific CN will be analyzed/matched
Domain Name (DN): (string)

The Matching Value field 312 may define the allowable field values for the field identified in the Matching Target field 308. In other words, the value in the Matching Value field 312 is the value that is compared to the digital certificate's field identified in the Matching Target field 308. If the value in the digital certificate satisfies the value defined in the Matching Value field 312, then the digital certificate may be considered to be owned by a trusted far end and the TLS session may be allowed to continue between the client device and far end device.

The description field 316 may provide a plain language description (e.g., for review by a system administrator) of the corresponding trusted host rule set. As can be seen in FIG. 3, wildcard values may be utilized in any field of the digital certificate, but is most likely used for certain digital certificate fields (e.g., the "subject alternate name" field as well as the CN field). The wildcard value may be provided at the beginning, middle, and/or end of a defined string. The use of a wildcard value allows the device 204, 216 a greater amount of flexibility in administering TLS sessions.

Figure 4:
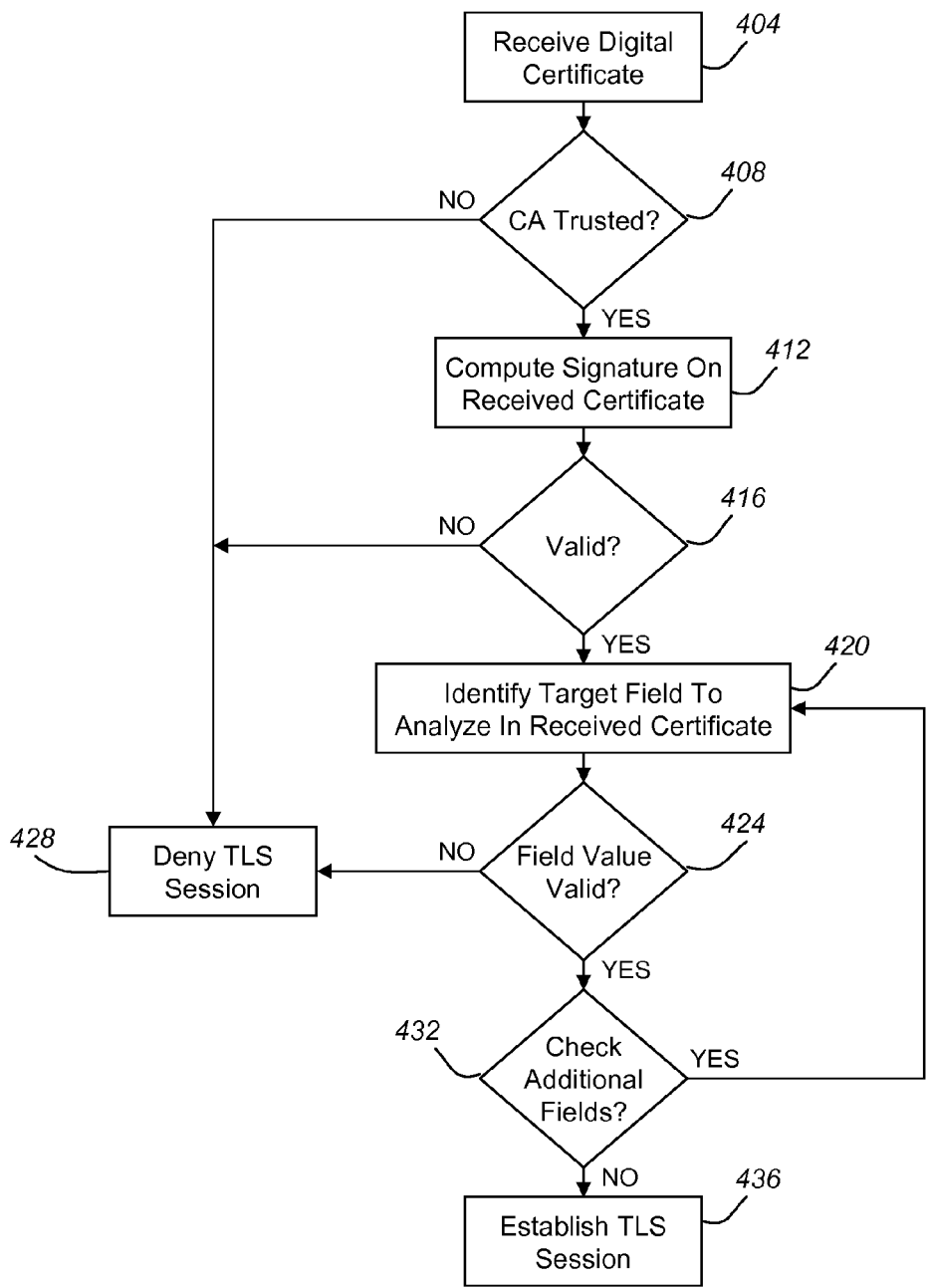
FIG. 4 is a flow chart depicting a certification method in accordance with at least some embodiments of the present invention.

With reference now to FIG. 4, an exemplary communication method will be described in accordance with at least some embodiments of the present invention. The method is initiated when a digital certificate is received at a client device 204, 216 from a far end device 208, 220 (step 404). The digital certificate may comprise any digital certificate format used in administering TLS sessions. In accordance with at least one embodiment of the present invention, the digital certificate may comprise a plurality of parameter fields with a corresponding field value. The field values of the digital certificate are the values that may be analyzed by the client device during administration of the TLS session.

Upon receipt of the digital certificate, the client device 204, 216 continues by checking the digital certificate to determine if a TLS session is allowed to be established with the far end device 208, 220 that transmitted the digital certificate (step 408). This analysis of the digital certificate may include the traditional checks performed on a digital certificate such as verifying that the digital certificate was issued by an authorized CA. Determination of whether the certificate was issued by an authorized CA may also include computing a signature on the received certificate (step 412) and determining whether the signature on the received certificate is valid (step 416). If either of these checks are not satisfied by the digital certificate, then the client device 204, 216 will deny the TLS session with the far end device 208, 220 (step 428). If, on the other hand, the CA and signature verifications are met, then the method continues.

The client device 204, 216 continues by identifying a target field to analyze in the digital certificate (step 420). As a default, the client device 204, 216 may begin checking the first trusted host rule set in the trusted host list 212 (i.e., the top-most trusted host rule set). The field identified in the Matching Target field 308 may correspond to the field that is analyzed in the digital certificate. Exemplary fields that may be identified in this step include, but are not limited to, a subject alt name field (DNS Name or IP), a CN field, or a DN field.

After the target field for analysis has been identified, the corresponding field value from the digital certificate is compared to a value defined in the Matching Value field 312 for the trusted host rule set currently being analyzed to determine whether the field value corresponds to a valid field value (step 424). The value defined in the Matching Value field 312 may correspond to a strictly required value or a flexibly required value (e.g., flexibly required via the use of a wildcard value or regular expression matching). If the value in the field of the digital certificate does not satisfy the requirements provided in the Matching Value field 312, then the client device 204, 216 denies the TLS connection (step 428).

If the value in the field of the digital certificate satisfies the requirements defined in the Matching Value field 312, then the method continues by determining whether additional fields need to be checked (step 432). The check of additional fields may be required if the trusted host list 212 contains at least one trusted host NOT rule set. The check of additional fields may also be required if the trusted host rule set contains additional target fields and corresponding field matching value requirements. If at least one trusted host rule set is satisfied by the digital certificate and no trusted host NOT rule set is violated, then the TLS session is established with the far end device (step 436).

In an alternative embodiment, additional advantages of using a trusted host list may be realized when used in connection with a server having multiple interfaces (e.g., Ethernet Interfaces (NICs)). More specifically, usually a server has only one NIC and thus has only one IP address and one name. But, in some instances, a multi-homed server with multiple NICs may be used, where each NIC has a unique IP address. In the standard way of using certificates, the certificate common name contains the IP address of the server. Therefore, if an organization has a multi-homed server, they would need multiple certificates assigned to that server in order to be able to satisfy the rule that the certificate must have the IP address in the common name. In accordance with at least some embodiments of the present invention, however, if a trusted host list and wild card valuation are utilized for various fields, then the server can have a single certificate used on all IP interfaces. Such a multi-homed server can be validated properly with only a single certificate assigned thereto.

While the above-described flowchart has been discussed in relation to a particular sequence of events, it should be appreciated that changes to this sequence can occur without materially effecting the operation of the invention. If the client device 204,216 does not have a trusted host list or the client is a browser, then the common name from the received certificate may be checked against the value in the browser's address bar in the standard manner, for example. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for creating and using an interactive voice response object. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   a processor receiving a digital certificate from a far end device;
   the processor determining that a Certificate Authority (CA) which issued the digital certificate to the far end device is an authorized CA;
   the processor establishing a secure communication session with the far end device;
   the processor comparing at least one field value of the digital certificate against at least one trusted host rule set in a trusted host list comprising two or more trusted host rule sets, wherein each of the two or more trusted host rule sets applies to a different host, wherein the trusted host list applies to multiple hosts, and wherein each trusted host rule set is associated with a particular CA requirement; and
   the processor determining whether to maintain the secure communication session based on the comparing step.

2. The method of claim 1, wherein at least one of the comparison and determination is made prior to or as part of session establishment.

3. The method of claim 1, wherein the comparison and determination is made prior to or as a part of the session establishment.

4. The method of claim 1, wherein the secure communication session comprises a TLS session.

5. The method of claim 1, wherein the field value is selected from at least one of the following data fields in the digital certificate: subject alt name DNS Name; subject alt name IP; Common Name; and Domain Name.

6. The method of claim 1, wherein each of the trusted host rule sets comprises at least one regular expression match value.

7. The method of claim 1, wherein each of the trusted host rule sets comprises a first Matching Target field and a first Matching Value field, wherein the first Matching Value field defines a field value required for an identified field of the digital certificate defined by the first Matching Target field.

8. The method of claim 7, wherein each of the trusted host rule sets comprises a second Matching Target field and a second Matching Value field.

9. The method of claim 7, wherein the determining step comprises:
   determining that the identified field value of the digital certificate corresponds to the first Matching Target field;
   determining that a value in the identified field of the digital certificate satisfies the Matching Value field requirement; and
   deciding to maintain the secure communication session.

10. The method of claim 7, wherein the determining step comprises:
    determining that a value in the identified field of the digital certificate does not satisfy the Matching Value field requirement; and
    deciding to discontinue the secure communication session.

11. The method of claim 1, wherein the at least one trusted host list comprises a plurality of trusted host rule sets.

12. The method of claim 11, wherein at least one of the plurality of trusted host rule sets comprise a logical NOT function.

13. The method of claim 1, wherein the at least one trusted host rule set comprises at least one wildcard match value.

14. A communication device, comprising:
    a processor operable to execute commands that, when executed, cause the communication device to:
       determine that a Certificate Authority (CA) which issued a digital certificate is an authorized CA;
       establish a secure communication session with a far end device that provided the digital certificate;
       compare a field value of the digital certificate against at least one trusted host rule set in a trusted host list comprising two or more trusted host rule sets, wherein each of the two or more trusted host rule sets applies to a different host, wherein the trusted host list applies to multiple hosts, and wherein each trusted host rule set is associated with a particular CA requirement; and
       determine whether to establish or maintain the secure communication session based on the comparison of the field value of the digital certificate against the at least one trusted host rule.

15. The device of claim 14, wherein the secure communication session comprises a TLS session.

16. The device of claim 14, wherein the field value is selected from at least one of the following data fields in the digital certificate: subject alt name DNS Name; subject alt name IP; Common Name; and Domain Name.

17. The device of claim 14, wherein the trusted host rule set comprises at least one regular expression match value.

18. The device of claim 14, wherein the trusted host rule set comprises a first Matching Target field and a first Matching Value field, wherein the first Matching Value field defines a field value required for an identified field of the digital certificate defined by the first Matching Target field.

19. The device of claim 18, wherein the trusted host rule set comprises a second Matching Target field and a second Matching Value field.

20. The device of claim 18, wherein determining whether to establish or maintain the secure communication session comprises:
    determining that the identified field value of the digital certificate corresponds to the first Matching Target field;
    determining that a value in the identified field of the digital certificate satisfies the Matching Value field requirement; and
    deciding to maintain the secure communication session.

21. The device of claim 18, wherein determining whether to establish or maintain the secure communication session comprises:
    determining that a value in the identified field of the digital certificate does not satisfy the Matching Value field requirement; and
    deciding to discontinue the secure communication session.

22. The device of claim 14, wherein the trusted host list comprises a plurality of trusted host rule sets and wherein at least one of the plurality of trusted host rule sets comprise a logical NOT function.

* * * * *

UNITED STATES PATENT AND TRADEMARK OFFICE
CERTIFICATE OF CORRECTION

PATENT NO. : 8,392,980 B1  
APPLICATION NO. : 12/196584  
DATED : March 5, 2013  
INVENTOR(S) : Ahrens et al.

Page 1 of 1

It is certified that error appears in the above-identified patent and that said Letters Patent is hereby corrected as shown below:

On the Title Page:

(75) Inventors: Please insert --III-- after 'Frank J. Boyle'.

Signed and Sealed this  
Ninth Day of July, 2013

Teresa Stanek Rea  
*Acting Director of the United States Patent and Trademark Office*